US011984992B2

(12) United States Patent
Wang

(10) Patent No.: US 11,984,992 B2
(45) Date of Patent: May 14, 2024

(54) WIRELESS COMMUNICATION METHOD AND USER EQUIPMENT FOR TRANSMITTING HARQ-ACK CODEBOOK

(71) Applicant: FG Innovation Company Limited, Tuen Mun (HK)

(72) Inventor: Hai-Han Wang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 225 days.

(21) Appl. No.: 17/395,928

(22) Filed: Aug. 6, 2021

(65) Prior Publication Data

US 2022/0045801 A1 Feb. 10, 2022

Related U.S. Application Data

(60) Provisional application No. 63/062,737, filed on Aug. 7, 2020.

(51) Int. Cl.
*H04L 1/1867* (2023.01)
*H04L 1/1812* (2023.01)
(Continued)

(52) U.S. Cl.
CPC .......... *H04L 1/1819* (2013.01); *H04L 1/1896* (2013.01); *H04W 72/23* (2023.01); *H04W 72/56* (2023.01)

(58) Field of Classification Search
CPC ... H04L 1/1819; H04L 1/1896; H04L 1/1822; H04L 1/1854; H04W 72/23; H04W 72/56
See application file for complete search history.

(56) References Cited

U.S. PATENT DOCUMENTS

| 2019/0103943 A1* | 4/2019 | Wang | H04L 1/1854 |
| 2022/0303100 A1* | 9/2022 | Yang | H04L 1/1671 |
| 2023/0043604 A1* | 2/2023 | Lee | H04L 1/1854 |

FOREIGN PATENT DOCUMENTS

CN 109639398 A 4/2019

OTHER PUBLICATIONS

3rd Generation Partnership Project; Technical Specification Group Radio Access Network; NR; Physical layer procedures for control, 3GPP TS 38.213 V16.2.0 (Jun. 2020) (Year: 2020).*

(Continued)

*Primary Examiner* — Shailendra Kumar
(74) *Attorney, Agent, or Firm* — ScienBiziP, P.C.

(57) ABSTRACT

A method performed by a User Equipment (UE) for transmitting a Hybrid Automatic Repeat Request-Acknowledgment (HARQ-ACK) codebook is provided. The method includes transmitting a report indicating support of the UE to transmit more than one Type-3 HARQ-ACK codebook; receiving a first Radio Resource Control (RRC) configuration including at least one parameter and receiving a second RRC configuration including a first Physical Uplink Control Channel (PUCCH) resource configuration and a second PUCCH resource configuration, the first PUCCH resource configuration being associated with a first HARQ-ACK codebook and the second PUCCH resource configuration being associated with a second HARQ-ACK codebook; receiving a Downlink Control Information (DCI) format; determining a priority indicated by the DCI format; selecting one of the first PUCCH resource configuration or the second PUCCH resource configuration based on the priority; and transmitting a third HARQ-ACK codebook via the PUCCH resource in a slot determined by the UE.

12 Claims, 2 Drawing Sheets

(51) Int. Cl.
H04W 72/23 (2023.01)
H04W 72/56 (2023.01)

(56) References Cited

OTHER PUBLICATIONS

Nokia, Nokia Shanghai Bell, Remaining issues on NR-U HARQ scheduling and feedback, 3GPP TSG RAN WG1 Meeting #100e, e-Meeting, Feb. 24-28, 2020, R1-2000503 (Year: 2020).*

Huawei, HiSilicon, HARQ enhancements in NR unlicensed, 3GPP TSG RAN WG1 Meeting #98bis, Chongqing, China, Oct. 14-20, 2019, R1-1910047 (Year: 2019).*

Nokia, Nokia Shanghai Bell, "Remaining issues on NR-U HARQ scheduling and feedback", R1-2000503, 3GPP TSG RAN WG1 Meeting #100e, e-Meeting, Feb. 24-28, 2020.

Huawei, HiSilicon, "HARQ enhancements in NR unlicensed", R1-1910047, 3GPP TSG RAN WG1 Meeting #98bis, Chongqing, China, Oct. 14-20, 2019.

3rd Generation Partnership Project, Technical Specification Group Radio Access Network, NR, Physical layer procedures for control, 3GPP TS 38.213 V16.0.0 (Dec. 2019).

* cited by examiner

WIRELESS COMMUNICATION METHOD AND USER EQUIPMENT FOR TRANSMITTING HARQ-ACK CODEBOOK

CROSS-REFERENCE TO RELATED APPLICATION(S)

The present disclosure claims the benefit of and priority to U.S. Provisional Patent Application Ser. No. 63/062,737, filed on Aug. 7, 2020, entitled "HARQ-ACK RETRANSMISSION IN IIOT". The contents of each of the above-mentioned applications are hereby fully incorporated herein by reference for all purposes.

FIELD

The present disclosure is generally related to wireless communications and, more specifically, to a wireless communication method and a user equipment for transmitting a Hybrid Automatic Repeat Request-Acknowledgment (HARQ-ACK) codebook.

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR) system, by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, as the demand for radio access continues to increase, there is a need in the art to improve transmission of a Hybrid Automatic Repeat Request-Acknowledgment (HARQ-ACK) codebook.

SUMMARY

The present disclosure is directed to methods and user equipment (UE) for transmitting a Hybrid Automatic Repeat Request-Acknowledgment (HARQ-ACK) codebook.

In a first aspect of the present application, a method performed by a User Equipment (UE) for transmitting a Hybrid Automatic Repeat Request-Acknowledgment (HARQ-ACK) codebook is provided. The method includes transmitting a report indicating support of the UE to transmit more than one Type-3 HARQ-ACK codebook; receiving a first Radio Resource Control (RRC) configuration including at least one parameter and receiving a second RRC configuration including a first Physical Uplink Control Channel (PUCCH) resource configuration and a second PUCCH resource configuration, the first PUCCH resource configuration being associated with a first HARQ-ACK codebook and the second PUCCH resource configuration being associated with a second HARQ-ACK codebook; receiving a Downlink Control Information (DCI) format; determining a priority indicated by the DCI format; selecting one of the first PUCCH resource configuration or the second PUCCH resource configuration based on the priority; determining a PUCCH resource from the one of the first PUCCH resource configuration or the second PUCCH resource configuration based on a PUCCH resource indicator field in the DCI format; determining a slot based on the one of the first PUCCH resource configuration or the second PUCCH resource configuration and based on a Physical Downlink Shared Channel-to-HARQ (PDSCH-to-HARQ) feedback timing indicator field in the DCI format; determining a size of a third HARQ-ACK codebook based on the DCI format and the at least one parameter, the third HARQ-ACK codebook being a Type-3 HARQ-ACK codebook; and transmitting the third HARQ-ACK codebook via the PUCCH resource in the slot.

In an implementation of the first aspect, the report indicates support of the UE to transmit the more than one Type-3 HARQ-ACK codebook in more than one subslot in the slot.

In another implementation of the first aspect, the selected one of the first PUCCH resource configuration or the second PUCCH resource configuration is the first PUCCH resource configuration if the priority is a low priority, and the selected one of the first PUCCH resource configuration or the second PUCCH resource configuration is the second PUCCH resource configuration if the priority is a high priority.

In another implementation of the first aspect, the at least one parameter includes one of a new data indicator parameter, a Code Block Group (CBG) parameter, and a priority parameter.

In another implementation of the first aspect, the first HARQ-ACK codebook is a Type-1 HARQ-ACK codebook or a Type-2 HARQ-ACK codebook; and the second HARQ-ACK codebook is the Type-1 HARQ-ACK codebook or the Type-2 HARQ-ACK codebook.

In a second aspect of the present application, a User Equipment (UE) in a wireless communication system for transmitting a Hybrid Automatic Repeat Request-Acknowledgment (HARQ-ACK) codebook is provided. The UE includes at least one processor; and at least one memory coupled to the at least one processor, wherein the at least one memory stores computer-executable instructions that, when executed by the at least one processor, cause the UE to transmit a report indicating support of the UE to transmit more than one Type-3 HARQ-ACK codebook; receive a first Radio Resource Control (RRC) configuration including at least one parameter and receiving a second RRC configuration including a first Physical Uplink Control Channel (PUCCH) resource configuration and a second PUCCH resource configuration, the first PUCCH resource configuration being associated with a first HARQ-ACK codebook and the second PUCCH resource configuration being associated with a second HARQ-ACK codebook; receive a Downlink Control Information (DCI) format; determining a priority indicated by the DCI format; selecting one of the first PUCCH resource configuration or the second PUCCH resource configuration based on the priority; determining a PUCCH resource from the one of the first PUCCH resource configuration or the second PUCCH resource configuration based on a PUCCH resource indicator field in the DCI format; determining a slot based on the one of the first PUCCH resource configuration or the second PUCCH resource configuration and based on a Physical Downlink Shared Channel-to-HARQ (PDSCH-to-HARQ) feedback timing indicator field in the DCI format; determine a size of a third HARQ-ACK codebook based on the DCI format and the at least one parameter, the third HARQ-ACK codebook being a Type-3 HARQ-ACK codebook; and transmit the third HARQ-ACK codebook via the PUCCH resource in the slot.

In a third aspect of the present application, a Base Station (BS) in a wireless communication system for receiving a Hybrid Automatic Repeat Request-Acknowledgment (HARQ-ACK) codebook from a User Equipment (UE) is provided. The BS includes at least one processor; and at least one memory coupled to the at least one processor, wherein the at least one memory stores computer-executable instructions that, when executed by the at least one processor, cause the BS to receive a report indicating support of the UE to transmit more than one Type-3 HARQ-ACK codebook; transmit a first Radio Resource Control (RRC) configuration including at least one parameter and transmit a second RRC configuration including a first Physical Uplink Control Channel (PUCCH) resource configuration and a second PUCCH resource configuration, the first PUCCH resource configuration being associated with a first HARQ-ACK codebook and the second PUCCH resource configuration being associated with a second HARQ-ACK codebook; transmit a Downlink Control Information (DCI) format; and receive a third HARQ-ACK codebook via a PUCCH resource in a slot, wherein the DCI format indicates a priority to instruct the UE to select one of the first PUCCH resource configuration or the second PUCCH resource configuration, a PUCCH resource indicator field in the DCI format instructs the UE to determine the PUCCH resource from the one of the first PUCCH resource configuration or the second PUCCH resource configuration, a Physical Downlink Shared Channel-to-HARQ (PDSCH-to-HARQ) feedback timing indicator field in the DCI format as well as the one of the first PUCCH resource configuration or the second PUCCH resource configuration instruct the UE to determine the slot, and the DCI format and the at least one parameter instruct the UE to determine a size of the third HARQ-ACK codebook, the third HARQ-ACK codebook being a Type-3 HARQ-ACK codebook.

BRIEF DESCRIPTION OF THE DRAWINGS

Aspects of the present disclosure are best understood from the following when read with the accompanying figures. Various features are not drawn to scale. Dimensions of various features may be arbitrarily increased or reduced for clarity of discussion.

DESCRIPTION

Figure 1:
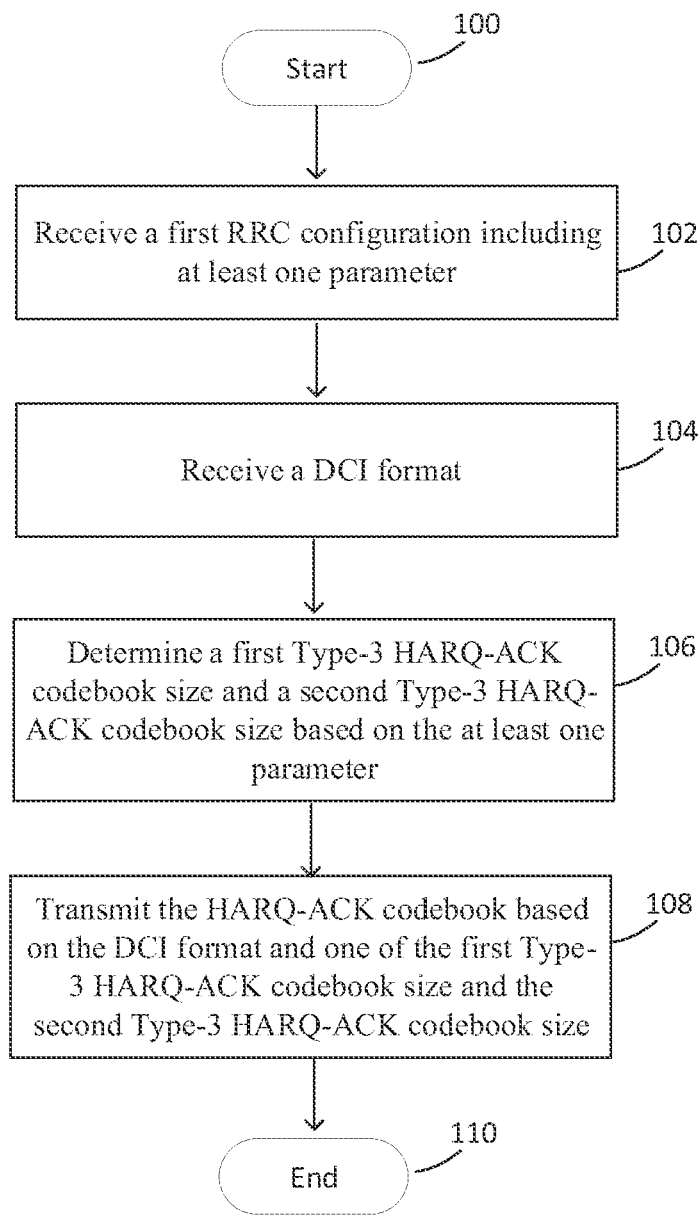
FIG. 1 illustrates a procedure for transmitting the HARQ-ACK codebook performed by a UE according to an implementation of the present disclosure.

The acronyms in the present disclosure are defined as follows. Unless otherwise specified, the acronyms have the following meanings.

Acronym Full name
3GPP 3$^{rd}$ Generation Partnership Project
ACK Acknowledgement
BS Base Station
CBG Code Block Group
DAI Downlink Assignment Index
DCI Downlink Control Information
DL Downlink
gNB g Node B
HARQ Hybrid Automatic Repeat Request
ID Identity
IE Information Element
IIoT Industrial Internet of Things
LSB Least Significant Bit
LTE Long-Term Evolution
MCG Master Cell Group
MSB Most Significant Bit
NDI New Data Indicator
NFI New Feedback Indicator
NR New Radio
NW Network
PCell Primary Cell
PDCCH Physical Downlink Control Channel
PDSCH Physical Downlink Shared Channel
PSCell Primary Secondary Cell
PUCCH Physical Uplink Control Channel
PUSCH Physical Uplink Shared Channel
RAN Radio Access Network
Rel Release
RRC Radio Resource Control
SCell Secondary Cell
SCG Secondary Cell Group
SI System Information
SpCell Special Cell
SPS Semi-Persistent Scheduling
SRI Scheduling Request Indicator
TB Transport Block
UE User Equipment
UL Uplink The following contains specific information pertaining to implementations of the present disclosure. The drawings and their accompanying detailed disclosure are directed to merely exemplary implementations. However, the present disclosure is not limited to these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are not meant to characterize that all implementations of the present disclosure must include the particular feature, structure, or characteristic, and should instead be understood to mean "at least some implementations of the present disclosure" include the stated particular feature, structure, or characteristic.

The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-disclosed combination, group, series, and the equivalent.

The term "and/or" is only an association relationship for describing associated objects, and represents that three relationships may exist. For example, A and/or B may represent that: A exists alone, A and B exist at the same time, and B exists alone. "A and/or B and/or C" may represent that at least one of A, B and C exists. In addition, the character "/" generally represents that the former and latter associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may include computer-executable instructions stored on computer-readable media, such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Application-Specific Integrated Circuits (ASICs), programmable logic arrays, and/or one or more Digital Signal Processor (DSPs). Although some of the example implementations in the present disclosure are directed to software installed and executing on computer hardware, alternative example implementations implemented as firmware, as hardware, or as a combination of hardware and software are well within the scope of the present disclosure.

The computer-readable medium includes, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., an LTE system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC) NW, an Evolved Universal Terrestrial Radio Access NW (E-UTRAN), a Next-Generation Core (NGC), a 5G Core Network (5GC), or an Internet) through a RAN established by the BS.

It should be noted that, in the present disclosure, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE (Enhanced Data rates for GSM Evolution) Radio Access NW (GERAN), a Next Generation eNB (ng-eNB) as in an E-UTRA BS in connection with the 5GC, a gNB as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the DL and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells.

In Multi-RAT Dual Connectivity (MR-DC) cases, the primary cell of an MCG or a SCG may be called a SpCell. A PCell may refer to the SpCell of an MCG. A PSCell may refer to the SpCell of an SCG. MCG refers to a group of serving cells associated with the Master Node (MN), including the SpCell and optionally one or more SCells. SCG refers to a group of serving cells associated with the Secondary Node (SN), including the SpCell and optionally one or more SCells.

In some implementations, the UE may not have (LTE/NR) RRC connections with the concerned serving cells of the associated services. In other words, the UE may not have UE-specific RRC signaling exchange with the serving cell. Instead, the UE may only monitor the DL synchronization signals (e.g., DL synchronization burst sets) and/or broadcasting SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next-generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

It is also considered that in a transmission time interval of a single NR frame, at least DL transmission data, a guard period, and UL transmission data should be included. The respective portions of the DL transmission data, the guard period, and the UL transmission data should also be configurable, for example, based on the NW dynamics of NR. In addition, SL resources may also be provided in an NR frame to support ProSe services.

Some technical terms are introduced in the following:

HARQ-ACK: This is a combination of the ARQ (Automatic Repeat reQuest) error control mechanism and FEC (Forward Error Correction) coding in which unsuccessful attempts are used in FEC decoding instead of being discarded. HARQ-ACK feedback is used to indicate whether a HARQ process is successfully received.

CBG: The code blocks of one TB may be grouped to a number of CBGs, and each may include the same or different number of code blocks. CBG-based retransmissions may be scheduled to carry a number of CBGs of a TB.

In an NR system, multiple types of services may be supported in a cell, each with different latency and reliability requirements. When a UE has both eMBB and URLLC traffic, it is possible that PUSCH/PUCCH transmission for such eMBB traffic is ongoing when the URLLC traffic occurs. In order to guarantee latency requirement for the URLLC traffic, the PUSCH/PUCCH transmission for the eMBB traffic need to be cancelled for the UE, so as to transmit PUSCH for the URLLC traffic. If the PUCCH transmission carrying HARQ-ACK is cancelled, the gNB needs to re-schedule the corresponding PDSCH, which may impact the system capacity, considering the eMBB PDSCH may consume a large amount of radio resources. Therefore, it is beneficial to design a mechanism for retransmitting HARQ-ACK when the HARQ-ACK is cancelled.

In Rel-16, a UE may be configured with two HARQ-ACK codebooks including one HARQ-ACK codebook being low priority (with priority index 0) and one HARQ-ACK codebook being high priority (with priority index 1), where each codebook may be a Type-1 HARQ-ACK codebook or a Type-2 HARQ-ACK codebook.

In Rel-16, due to introduction of intra-UE prioritization, a low priority HARQ-ACK PUCCH may be cancelled if the UE is scheduled with a high priority PUSCH/PUCCH overlapping with the low priority HARQ-ACK PUCCH. It is also possible that a low priority HARQ-ACK codebook multiplexed in a low priority PUSCH is cancelled if the low priority HARQ-ACK codebook is overlapping with a high priority PUCCH or overlapping with the UL resource indicated by a DCI format 2_4. Furthermore, the high priority HARQ-ACK codebook multiplexed in a high priority PUSCH may also be cancelled if the high priority HARQ-ACK codebook is overlapping with the UL resource indicated by a DCI format 2_4, and if UE is not configured with applicabilityforCI. Since either the high priority HARQ-ACK codebook or the low priority HARQ-ACK codebook may be cancelled, mechanism for retransmission of both high and low priority HARQ-ACK codebooks should be supported.

Enhanced Type-2 HARQ-ACK Codebook

Enhanced Type-2 HARQ-ACK codebook is introduced in Rel-16 for use of HARQ-ACK codebook retransmission for operation in a cell with shared spectrum channel access. The following fields may be included in DCI format 1_1 or DCI format 1_2 for transmission of one enhanced Type-2 HARQ-ACK codebook.

NFI: This may be act as a toggle bit for a PDSCH group. If the NFI for the PDSCH group is toggled, the UE may discard the HARQ-ACK feedback for the PDSCH(s) of the PDSCH group, where the PDSCH(s) may be associated with a non-numerical K1 value.

Number of requested PDSCH group(s): This may include "0" for only the scheduled PDSCH group and "1" for both PDSCH groups.

PDSCH group index (1 bit): This may indicate the PDSCH group index of the scheduled PDSCH.

When constructing the enhanced Type-2 HARQ-ACK codebook, the UE may use counter DAI, total DAI, and the associated PDCCH monitor occasions of a PUCCH transmission for determining the order of the HARQ-ACK bits and the size of the HARQ-ACK codebook in the enhanced Type-2 HARQ-ACK codebook for the PUCCH transmission. The difference between the enhanced Type-2 HARQ-ACK codebook and the Type-2 HARQ-ACK codebook is that the UE may not discard a HARQ-ACK codebook after the PUCCH transmission of the HARQ-ACK codebook. If the NFI value is not toggled between one NFI of the DCI scheduling a first PUCCH and another NFI of the DCI scheduling a second PUCCH, the HARQ-ACK bits in one HARQ-ACK codebook of the first PUCCH are included in the HARQ-ACK codebook of the second PUCCH. In other words, if the NFI values are the same for the scheduling PDCCHs, the DAI values are set continuously for the PDSCHs with corresponding HARQ-ACKs to be transmitted in consecutive PUCCHs.

To enable retransmission of the HARQ-ACKs while ensuring reasonable overhead of the HARQ-ACK retransmission, the PDSCHs can be divided into two PDSCH groups by assigning each scheduled PDSCH with a PDSCH group index using a PDSCH group index field in the scheduling DCI, and the gNB may request the HARQ-ACKs corresponding to the PDSCHs of one or both PDSCH groups in one PUCCH by the value of the requested PDSCH group field in the DCI scheduling the PUCCH.

The following RRC parameters may be used for configuration of an enhanced Type-2 HARQ-ACK codebook. Specifically, an RRC parameter, e.g., pdsch-HARQ-ACK-Codebook-r16, may be configured in PhysicalCellGroupConfig to indicate that enhanced Type-2 HARQ-ACK codebook is the type of HARQ-ACK codebook that is used in a cell group. An RRC parameter, e.g., nfi-TotalDAI-Included-r16, may be configured in PhysicalCellGroupConfig to indicate that an NFI field and a total DAI field for a first PDSCH group are included in a DCI format 1_1 that schedules PDSCH(s) of a second PDSCH group. An RRC parameter, e.g., ul-TotalDAI-Included-r16, may be configured in PhysicalCellGroupConfig to indicate that a total DAI field for the first PDSCH group is included in a DCI format 0_1 that schedules a PUSCH which is used for multiplexing a PUCCH scheduled by the DCI format 1_1.

Type-3 HARQ-ACK Codebook

The Type-3 HARQ-ACK codebook is introduced in Rel-16 for use of the HARQ-ACK codebook retransmission for operation in a cell with shared spectrum channel access. A one-shot HARQ-ACK request field may be included in DCI format 1_1 to trigger transmission of one Type-3 HARQ- ACK codebook. If the one-shot HARQ-ACK request field indicates '1', the UE may be triggered to report the Type-3 HARQ-ACK codebook.

The Type-3 HARQ-ACK codebook includes the HARQ-ACK bits for all DL HARQ processes of the configured cells. In addition, each NDI value of the HARQ process in the scheduling DCI may be appended to the HARQ-ACK bit of the corresponding HARQ process. When the NDI is not included in one Type-3 HARQ-ACK codebook, the UE may set the HARQ-ACK bit as NACK for a HARQ process ID once an ACK is reported for the same HARQ process ID in the previous feedback. Furthermore, CBG level HARQ-ACK bits may also be included.

The ordering of information for HARQ-ACK bits in the Type-3 HARQ-ACK codebook is as follows:
  First, in increasing order of a CBG index
  Second, in increasing order of a TB index
  Third, in increasing order of a HARQ process ID
  Fourth, in increasing order of a serving cell index An RRC parameter, pdsch-HARQ-ACK-OneShotFeedback-r16, may be configured in PhysicalCellGroupConfig to indicate one Type-3 HARQ-ACK codebook is used in a cell group. It may be configured regardless of whether a Type-1 HARQ-ACK codebook, a Type-2 HARQ-ACK codebook, or an enhanced Type-2 HARQ-ACK codebook is configured in the cell group. An RRC parameter, e.g., pdsch-HARQ-ACK-OneShotFeedbackNDI-r16, may be configured in PhysicalCellGroupConfig to indicate NDI is included in one Type-3 HARQ-ACK codebook. An RRC parameter, e.g., pdsch-HARQ-ACK-OneShotFeedbackCBG-r16, may be configured in PhysicalCellGroupConfig to indicate the CBG level HARQ-ACK is included in one Type-3 HARQ-ACK codebook for the $N_{cells}^{DL,CBG}$ cells configured with CBG transmission.

First, it is important to solve configuration and scheduling of the enhanced Type-2 HARQ-ACK codebook for the high priority HARQ-ACK codebook and the low priority HARQ-ACK codebook.

For an IIoT application, the high priority HARQ-ACK codebook may be configured in addition to the low priority HARQ-ACK codebook. Assuming that both priority (e.g., high and low priorities) HARQ-ACK codebooks are being configured, if one pdsch-HARQ-ACK-Codebook-r16 is configured and set to enhancedDynamic, it is unclear which priority of the HARQ-ACK codebook is configured as the enhanced Type-2 HARQ-ACK codebook. If both the priority HARQ-ACK codebooks are configured as the enhanced Type-2 HARQ-ACK codebook, it is important to define how many PDSCH groups are to be assigned and how to assign PDSCH groups and request the HARQ-ACK bits for the groups.

Second, it is important to solve configuration and scheduling of the Type-3 HARQ-ACK codebook for a high priority HARQ-ACK codebook and low priority HARQ-ACK codebook.

In case both priority HARQ-ACK codebooks are configured, if pdsch-HARQ-ACK-OneShotFeedback-r16 is configured and set to true, it is unclear which PUCCH-Config are the PUCCH resources used for transmission of the Type-3 HARQ-ACK codebook. In addition, it is necessary to define how to set the contents of one Type-3 HARQ-ACK codebook.

Methods for configuration and scheduling of enhanced Type-2 HARQ-ACK codebook for high priority HARQ-ACK codebook and low priority HARQ-ACK codebook First, the PDSCH-HARQ-ACK-CodebookList-r16, as shown in Table 1, is used for configuration of the high priority HARQ-ACK codebook and the low priority HARQ-ACK codebook, and the pdsch-HARQ-ACK-Codebook-r16 is used for indicating which HARQ-ACK codebook is the enhanced Type-2 HARQ-ACK codebook with following extension. When the high priority HARQ-ACK codebook and the low priority HARQ-ACK codebook are both configured as dynamic in PDSCH-HARQ-ACK-CodebookList-r16 and if pdsch-HARQ-ACK-Codebook-r16 is configured and set to enhancedDynamicForBoth, both the high priority HARQ-ACK codebook and the low priority HARQ-ACK codebook are configured as the enhanced Type-2 HARQ-ACK codebook.

TABLE 1

| PDSCH-HARQ-ACK-CodebookList-r16 ::= | SEQUENCE (SIZE (1..2)) OF ENUMERATED {semiStatic, dynamic} |
|---|---|
| pdsch-HARQ-ACK-Codebook-r16 | ENUMERATED {enhancedDynamic, enhancedDynamicForBoth} |

Second, some implementations of assigning PDSCH groups are introduced. The UE may report its capability of how many PDSCH groups may be supported for the high priority HARQ-ACK codebook and the low priority HARQ-ACK codebook. When both the high priority HARQ-ACK codebook and the low priority HARQ-ACK codebook are configured as the enhanced Type-2 HARQ-ACK codebook, the gNB may configure the number of PDSCH groups for the high priority HARQ-ACK codebook and the low priority HARQ-ACK codebook based on the reported UE capability.

Third, some implementations of determining the number of bits for the DCI fields used for the enhanced Type-2 HARQ-ACK codebook are introduced. The gNB may configure nfi-TotalDAI-Included-r16 and ul-TotalDAI-Included-r16, separately, for each enhanced Type-2 HARQ-ACK codebook corresponding to one specific priority. The number of bits of a field is aligned based on the configuration of one HARQ-ACK codebook with different priority that results in the largest number of bits for the field.

Methods for Configuration and Scheduling of Type-3 HARQ-ACK Codebook for High Priority HARQ-ACK Codebook and Low Priority HARQ-ACK Codebook When both the high priority HARQ-ACK codebook and the low priority HARQ-ACK codebook are configured and if the one-shot HARQ-ACK request field in a DCI is set to 1, one Type-3 HARQ-ACK codebook is transmitted in the PUCCH resource, as selected based on a PUCCH resource indicator field in the DCI, configured in the PUCCH-Config associated with the priority indicated by the DCI.

In addition, some implementations for determining the contents of one Type-3 HARQ-ACK codebook are introduced. When both the high priority HARQ-ACK codebook and the low priority HARQ-ACK codebook are configured and when the NDI is configured to be included in one Type-3 HARQ-ACK codebook, the bits corresponding to the DL HARQ processes scheduled by DCIs indicating the same priority as the DCI triggering the Type-3 HARQ-ACK codebook are set to the HARQ-ACK states of the corresponding DL HARQ processes. For the bits corresponding to the DL HARQ processes that are not set to the HARQ-ACK states, NACK is set for those bits.

More details of configuration and scheduling of the enhanced Type-2 HARQ-ACK codebook for the high priority HARQ-ACK codebook and the low priority HARQ-ACK codebook are presented in the following.

In some implementations, the PDSCH-HARQ-ACK-CodebookList-r16, as shown in Table 1, is used for configuration of the high priority HARQ-ACK codebook and the low priority HARQ-ACK codebook, and pdsch-HARQ-ACK-Codebook-r16 is used for indicating which HARQ-ACK codebook is the enhanced Type-2 HARQ-ACK codebook with following extension. When the high priority HARQ-ACK codebook and the low priority HARQ-ACK codebook are both configured as dynamic in PDSCH-HARQ-ACK-CodebookList-r16, and if pdsch-HARQ-ACK-Codebook-r16 is configured and set to enhancedDynamicForBoth, both the high priority HARQ-ACK codebook and the low priority HARQ-ACK codebook are configured as the enhanced Type-2 HARQ-ACK codebook.

In one implementation, when the high priority HARQ-ACK codebook and the low priority HARQ-ACK codebook are both configured as dynamic in the PDSCH-HARQ-ACK-CodebookList-r16, and if the pdsch-HARQ-ACK-Codebook-r16 is configured and set to enhancedDynamic, the HARQ-ACK codebook that corresponds to a fixed priority is configured as the enhanced Type-2 HARQ-ACK codebook. For example, the fixed priority is low priority. In one implementation, when only one HARQ-ACK codebook is configured as dynamic in the PDSCH-HARQ-ACK-CodebookList-r16, and if the pdsch-HARQ-ACK-Codebook-r16 is configured and set to enhancedDynamic, the HARQ-ACK codebook configured as dynamic in the PDSCH-HARQ-ACK-CodebookList-r16 is configured as the enhanced Type-2 HARQ-ACK codebook.

In some implementations, the pdsch-HARQ-ACK-Codebook-r17 is used for indicating which HARQ-ACK codebook is the enhanced Type-2 HARQ-ACK codebook, as shown in Table 2.

HARQ-ACK codebook. The UE may report the combinations of the number of PDSCH groups within each HARQ-ACK codebook of a specific priority separately for each or a subset of the following configuration.

In one implementation, both the high priority HARQ-ACK codebook and the low priority HARQ-ACK codebook are configured and the PUCCH-Config associated with both the HARQ-ACK codebooks are not configured with subslotLengthForPUCCH-r16. In one example, PDSCH-CodeBlockGroupTransmission associated with both HARQ-ACK codebooks are not configured, PDSCH-CodeBlockGroupTransmission associated with one HARQ-ACK codebook is configured, or PDSCH-CodeBlockGroupTransmission associated with both HARQ-ACK codebooks are configured.

In another implementation, both the high priority HARQ-ACK codebook and the low priority HARQ-ACK codebook are configured and the PUCCH-Config associated with one HARQ-ACK codebook is configured with subslotLengthForPUCCH-r16. In one example, PDSCH-CodeBlockGroupTransmission associated with both HARQ-ACK codebooks are not configured, PDSCH-CodeBlockGroupTransmission associated with one HARQ-ACK codebook is configured, or PDSCH-CodeBlockGroupTransmission associated with both HARQ-ACK codebooks are configured.

In another implementation, both the high priority HARQ-ACK codebook and the low priority HARQ-ACK codebook are configured and the PUCCH-Config associated with both HARQ-ACK codebooks are configured with subslotLengthForPUCCH-r16. In one example, PDSCH-CodeBlockGroupTransmission associated with both HARQ-ACK codebooks are not configured, PDSCH-CodeBlockGroupTransmission associated with one HARQ-ACK codebook is configured, or PDSCH-CodeBlockGroupTransmission associated with both HARQ-ACK codebooks are configured.

In another implementation, only the low priority HARQ-ACK codebook is configured and the PUCCH-Config asso-

TABLE 2

| | |
|---|---|
| pdsch-HARQ-ACK-Codebook-r17 | ENUMERATED {low, high, both, spare} |

When the high priority HARQ-ACK codebook and the low priority HARQ-ACK codebook are both configured as dynamic in the PDSCH-HARQ-ACK-CodebookList-r16, the pdsch-HARQ-ACK-Codebook-r17 is used to indicate which HARQ-ACK codebook is configured as the enhanced Type-2 HARQ-ACK codebook. The pdsch-HARQ-ACK-Codebook-r17 is set to low, high, or both to indicate that the low priority HARQ-ACK codebook, the high priority HARQ-ACK codebook, or both the low and high priority HARQ-ACK codebooks are configured as the enhanced Type-2 HARQ-ACK codebook, respectively.

The PDSCH groups that may be scheduled when both the high priority HARQ-ACK codebook and the low priority HARQ-ACK codebook are configured and are both the enhanced Type-2 HARQ-ACK codebook and are introduced in the following.

PDSCH group 1 of low priority, . . . , PDSCH group X of low priority

PDSCH group 1 of high priority, . . . , PDSCH group X of high priority

In some implementations, the solution of assigning PDSCH groups is introduced. The UE may report its capability related to how many PDSCH groups it supports for the high priority HARQ-ACK codebook and the low priority ciated with the HARQ-ACK codebook is configured with subslotLengthForPUCCH-r16. In one example, PDSCH-CodeBlockGroupTransmission associated with the HARQ-ACK codebook is not configured, or PDSCH-CodeBlockGroupTransmission associated with the HARQ-ACK codebook is configured.

In some implementations, the reported number of PDSCH groups within one HARQ-ACK codebook of a priority for some configuration scenarios may be 0.

In some implementations, when both the high priority HARQ-ACK codebook and the low priority HARQ-ACK codebook are configured as the enhanced Type-2 HARQ-ACK codebook, the gNB may configure the number of PDSCH groups for the high priority HARQ-ACK codebook and the low priority HARQ-ACK codebook based on the reported UE capability. In one implementation, the UE may decide the configured number of PDSCH groups within each HARQ-ACK codebook of a specific priority implicitly according to the reported capability for the configuration scenario. In one implementation, if the gNB does not configure the number of PDSCH groups, the UE may assume one PDSCH group for the high priority HARQ-ACK codebook and one PDSCH group for the low priority HARQ-ACK codebook. In one implementation, if the gNB does not configure the number of PDSCH groups, the UE may assume one PDSCH group for the high priority HARQ-ACK codebook and two PDSCH groups for the low priority HARQ-ACK codebook.

In some implementations, configuration of the number of PDSCH groups within each HARQ-ACK codebook of a specific priority may be indicated by one RRC parameter, e.g., nrofPDSCHGroups, in PhysicalCellGroupConfig or in the associated PUCCH-Config.

In some implementations, when the high priority HARQ-ACK codebook and the low priority HARQ-ACK codebook are both configured and are both the enhanced Type-2 HARQ-ACK codebook, one NFI bit is applicable only to the PDSCH group associated with the NFI bit and scheduled by the DCIs indicating the same priority. The PDSCH group index field in the DCI indicates one PDSCH group within a specific priority indicated by or associated with the DCI. The number of requested PDSCH group(s) field in the DCI indicate the number of requested PDSCH group(s) within a specific priority indicated by or associated with the DCI.

In some implementations, the number of requested PDSCH group(s) may be configured to indicate the number of requested PDSCH group(s) within both priorities. In one example, when a subset or all PDSCH groups within both priorities are requested by one DCI indicating low priority, the HARQ-ACK bits of the high priority codebook are appended to the HARQ-ACK bits of the low priority codebook and reported in the PUCCH resource in the first PUCCH-Config indicated by or associated with the DCI.

In some implementations, the solution of determining the number of bits for the DCI fields used for the enhanced Type-2 HARQ-ACK codebook is introduced. The gNB may configure nfi-TotalDAI-Included-r16 and ul-TotalDAI-Included-r16, separately, for each enhanced Type-2 HARQ-ACK codebook of a specific priority. The number of bits of a field is aligned based on the configuration of one HARQ-ACK codebook of the priority that results in the largest number of bits for the field.

In some implementations, the UE may determine the number of bits of the NFI field and the DAI field in DCI format 1_1 or DCI format 1_2 for the high priority HARQ-ACK codebook based on the nfi-TotalDAI-Included-r16 associated with the high priority HARQ-ACK codebook, and may determine the number of bits of the NFI field and the DAI field in DCI format 1_1 or DCI format 1_2 for the low priority HARQ-ACK codebook based on the nfi-TotalDAI-Included-r16 associated with the low priority HARQ-ACK codebook.

In one implementation, for one HARQ-ACK codebook of a priority, the NFI field has 1 bit if the enhanced Type-2 HARQ-ACK codebook is configured for the priority and the associated nfi-TotalDAI-Included-r16 is not configured; and the NFI field has 2 bits if the enhanced Type-2 HARQ-ACK codebook is configured for the priority and the associated nfi-TotalDAI-Included-r16 is configured; otherwise, the NFI field has 0 bit.

In one implementation, for the HARQ-ACK codebook of a priority, the DAI field has the following:
  6 bits if more than one serving cell is configured in the DL and nfi-TotalDAJ-Included-r16 enable for the priority. The 4 MSB bits are the counter DAI and the total DAI for the scheduled PDSCH group of the priority, and the 2 LSB bits are the total DAI for the non-scheduled PDSCH group of the priority;
  4 bits if only one serving cell is configured in the DL and nfi-TotalDAJ-Included-r16 enable for the priority. The 2 MSB bits are the counter DAI for the scheduled PDSCH group of the priority, and the 2 LSB bits are the total DAI for the non-scheduled PDSCH group of the priority;
  4 bits if more than one serving cell is configured in the DL, the HARQ-ACK codebook is the Type-2 HARQ-ACK codebook or the HARQ-ACK codebook is the enhanced Type-2 HARQ-ACK codebook, and nfi-TotalDAI-Included-r16 for the priority is not configured, where the 2 MSB bits are the counter DAI and the 2 LSB bits are the total DAI;
  2 bits if only one serving cell is configured in the DL, the HARQ-ACK codebook is the Type-2 HARQ-ACK codebook or the HARQ-ACK codebook is the enhanced Type-2 HARQ-ACK codebook, and nfi-TotalDAI-Included-r16 for the priority is not configured, when the UE is not configured with CORESETPoolIndex or the value of CORESETPoolIndex is the same for all CORESETs if CORESETPoolIndex is provided or the UE is not configured with ACKNACKFeedbackMode=JointFeedback, where the 2 bits are the counter DAI;
  0 bits otherwise.

In some implementations, the UE may determine the number of bits of the DAI fields in DCI format 0_1 or DCI format 0_2 for the high priority HARQ-ACK codebook based on the ul-TotalDAI-Included-r16 associated with the high priority HARQ-ACK codebook, and may determine the number of bits of the DAI fields in DCI format 0_1 or DCI format 0_2 for the low priority HARQ-ACK codebook based on the ul-TotalDAI-Included-r16 associated with the low priority HARQ-ACK codebook.

In one implementation, for one HARQ-ACK codebook of a priority, the $1^{st}$ DAI field has the following:
  1 bit if the Type-1 HARQ-ACK codebook is configured for the priority;
  2 bits if the Type-2 HARQ-ACK codebook is configured for the priority, or if the enhanced Type-2 HARQ-ACK codebook is configured for the priority and ul-TotalDAI-Included-r16 for the priority is not configured;
  4 bits if the enhanced Type-2 HARQ-ACK codebook is configured for the priority and ul-TotalDAI-Included-r16=enable for the priority.

In one implementation, for one HARQ-ACK codebook of a priority, the $2^{nd}$ DAI field has the following:
  2 bits if the Type-2 HARQ-ACK codebook is configured for the priority and configured with two HARQ-ACK sub-codebooks, or if the enhanced Type-2 HARQ-ACK codebook is configured for the priority and configured with two HARQ-ACK sub-codebooks and ul-TotalDA-Included-r16 for the priority is not configured;
  4 bits if the enhanced Type-2 HARQ-ACK codebook is configured for the priority and configured with two HARQ-ACK sub-codebooks and ul-TotalDAJ-Included-r16=enable for the priority;
  0 bits otherwise.

In some implementations, when the HARQ-ACK codebooks of different priorities are configured for the same serving cell, and if the priority indicator is configured for one DCI format, to align the size of the DCI field for the HARQ-ACK codebooks of different priorities when the configurations associated with the HARQ-ACK codebooks of different priorities results in different number of bits for the field, a number of MSBs with value set to '0' are inserted to the DCI field of the HARQ-ACK codebook of a priority with a smaller number of bits until the bit width of the DCI field in the DCI format for the HARQ-ACK codebooks of different priorities are the same.

In some implementations, when the Type-2 HARQ-ACK codebook is configured for a priority and the enhanced Type-2 HARQ-ACK codebook is configured for the other priority, and if the priority indicator is configured for one DCI format, to align the size of the number of the requested PDSCH group field and the PDSCH group index field, the DCI fields are present and '0's are inserted for the HARQ-ACK codebook of the priority not configured with the DCI fields.

In some implementations, the solution of configuration and scheduling of the Type-3 HARQ-ACK codebook for the high priority HARQ-ACK codebook and the low priority HARQ-ACK codebook is introduced.

When both the high priority HARQ-ACK codebook and the low priority HARQ-ACK codebook are configured, and if the Type-3 HARQ-ACK codebook is triggered (e.g., the one-shot HARQ-ACK request field in a DCI is set to 1), the Type-3 HARQ-ACK codebook is transmitted in the PUCCH resource, which is selected based on the PUCCH resource indicator field in the DCI, configured in the PUCCH-Config associated with the priority indicated by or associated with the DCI. The slot in which the PUCCH is transmitted is K1 slots from the slot where the DCI is received, and K1 is a value selected from dl-DataToUL-ACK or dl-DataToUL-ACK-r16 configured in the PUCCH-Config associated with the priority indicated by or associated with the DCI, based on a PDSCH-to-HARQ_feedback timing indicator field in the DCI scheduling the PUCCH when the DCI is a DCI format 1_1, and K1 is a value selected from DL-DataToUL-ACK-ForDCI-Format1-2-r16 configured in the PUCCH-Config associated with the priority indicated by or associated with the DCI, based on the PDSCH-to-HARQ_feedback timing indicator field in the DCI scheduling the PUCCH when the DCI is when the DCI is a DCI format 1_2. If the PUCCH-Config is configured with subslotLengthForPUCCH-r16, the offset indicated by the K1 value is in unit of subslot of the length configured by subslotLengthForPUCCH-r16. If a PDSCH is scheduled by the DCI, the reference slot or reference subslot for counting the slot offset or subslot offset indicated by the K1 value is the UL slot or UL subslot overlapping with the end of the PDSCH scheduled by the DCI. If no PDSCH is scheduled by the DCI, the reference slot or reference subslot for counting the slot offset or subslot offset is the UL slot or UL subslot overlapping with the end of the DCI.

In some implementations, the priority of the Type-3 HARQ-ACK codebook and the PUCCH-Config in which the PUCCH resource is used for the Type-3 HARQ-ACK codebook may be configured by one explicit RRC parameter.

In some implementations, when both high priority HARQ-ACK codebook and low priority HARQ-ACK codebook are configured and when the NDI is configured to be included in one Type-3 HARQ-ACK codebook, the HARQ-ACK bits corresponding to the DL HARQ processes scheduled by the DCIs indicating the same priority as the DCI triggering the Type-3 HARQ-ACK codebook are set to the HARQ-ACK states of the corresponding DL HARQ processes. For one triggered Type-3 HARQ-ACK codebook, when the NDI is configured not to be included in the Type-3 HARQ-ACK codebook, and the HARQ-ACK bits have not been reported as an ACK for the corresponding DL HARQ processes in previous PUCCH or PUSCH, the HARQ-ACK bits corresponding to the DL HARQ processes scheduled by the DCIs that indicate the same priority as the DCI triggering the Type-3 HARQ-ACK codebook are set to the HARQ-ACK states of the corresponding DL HARQ processes. Alternatively, for the HARQ-ACK bits corresponding to the DL HARQ processes that are not set to the HARQ-ACK states, NACK is set for those bits.

In one implementation, when the NDI is configured to be included in one Type-3 HARQ-ACK codebook, the HARQ-ACK bits corresponding to the DL HARQ processes scheduled by the DCIs indicating the same priority as the DCI triggering the Type-3 HARQ-ACK codebook are set to the HARQ-ACK states of the corresponding DL HARQ processes if the high priority is indicated in the triggering DCI, or the HARQ-ACK bits corresponding to all DL HARQ processes are set to the HARQ-ACK states of the corresponding DL HARQ processes if the low priority is indicated in the triggering DCI. For one triggered Type-3 HARQ-ACK codebook, when the NDI is configured not to be included in one Type-3 HARQ-ACK codebook, and the HARQ-ACK bits have not been reported as an ACK for the corresponding DL HARQ processes in previous PUCCH or PUSCH, the HARQ-ACK bits corresponding to the DL HARQ processes scheduled by DCIs that indicate the same priority as the DCI triggering the Type-3 HARQ-ACK codebook are set to the HARQ-ACK states of the corresponding DL HARQ processes if the high priority is indicated in the triggering DCI. For one triggered Type-3 HARQ-ACK codebook, when the NDI is configured not to be included in one Type-3 HARQ-ACK codebook, and the HARQ-ACK bits have not been reported as an ACK for the corresponding DL HARQ processes in previous PUCCH or PUSCH, the HARQ-ACK bits are set to the HARQ-ACK states of the corresponding DL HARQ processes if the low priority is indicated in the triggering DCI.

In one implementation, a number of requested PDSCH group(s) field in the DCI triggering the Type-3 HARQ-ACK codebook is used to indicate a priority. For one triggered Type-3 HARQ-ACK codebook, the HARQ-ACK bits corresponding to the DL HARQ processes scheduled by DCIs indicating the priority are set to the HARQ-ACK states of the corresponding DL HARQ processes. For example, if the field is set to '0', only the bits corresponding to the DL HARQ processes scheduled by the DCIs indicating the same priority as the DCI triggering the Type-3 HARQ-ACK codebook are set to the HARQ-ACK states of the corresponding DL HARQ processes. If the field is set to '1', the bits corresponding to the DL HARQ processes scheduled by the DCIs indicating the same priority as or different priority from the DCI triggering the Type-3 HARQ-ACK codebook are set to the HARQ-ACK states of the corresponding DL HARQ processes.

In one implementation, assuming that both the high priority HARQ-ACK codebook and the low priority HARQ-ACK codebook are configured and maxCodeBlockGroupsPerTransportBlock in PDSCH-CodeBlockGroupTransmission associated with the high priority HARQ-ACK codebook is configured with a different value from maxCodeBlockGroupsPerTransportBlock in PDSCH-CodeBlockGroupTransmission associated with the low priority HARQ-ACK codebook in a cell, if pdsch-HARQ-ACK-OneShotFeedbackCBG-r16 is configured, the number of CBG bits, e.g., $N_{HARQ\text{-}ACK,c}^{CBG,TB,max}$, for one TB inside the cell in one Type-3 HARQ-ACK codebook are determined based on the maximum value of the two values associated with the high priority HARQ-ACK codebook and the low priority HARQ-ACK codebook. When maxCodeBlockGroupsPerTransportBlock in PDSCH-CodeBlockGroupTransmission associated with the high priority HARQ-ACK codebook is configured with a different value from maxCodeBlockGroupsPerTransportBlock in PDSCH- CodeBlockGroupTransmission associated with the low priority HARQ-ACK codebook in a cell and pdsch-HARQ-ACK-OneShotFeedbackCBG-r16 is configured, if the UE receives a SPS PDSCH or a PDSCH in the cell that is scheduled by a DCI format 10, the UE may repeat $N_{HARQ-ACK,c}^{CBG/TB,max}$ times the HARQ-ACK information for the TB in the SPS PDSCH or in the PDSCH for transmission of the HARQ-ACK information in a Type-3 HARQ-ACK codebook.

In one implementation, for the Type-3 HARQ-ACK codebook triggered by one DCI indicating a priority, the number of CBG bits, e.g., $N_{HARQ-ACK,c}^{CBG/TB,max}$ for one TB inside a cell in the Type-3 HARQ-ACK codebook are determined based on the maxCodeBlockGroupsPerTransportBlock in PDSCH-CodeBlockGroupTransmission associated with the HARQ-ACK codebook of the priority. For the bits corresponding to the DL HARQ processes scheduled by the DCIs indicating a different priority from the priority indicated by the DCI triggering the Type-3 HARQ-ACK codebook, if the N ac determined for the different priority is equal to or smaller than the $N_{HARQ-ACK,c}^{CBG/TB,max}$ determined for the priority indicated by the triggering DCI, denoted as $$N_{HARQ-ACK,c}^{\frac{CBG}{TB},max,DCI}, N_{HARQ-ACK,c}^{\frac{CBG}{TB},max,DCI}$$

HARQ-ACK bits are included in the Type-3 HARQ-ACK codebook for each TB, and the CBG HARQ-ACK states for the DL HARQ processes are set for the bits if there is a corresponding CBG that is scheduled. If the N A determined for the different priority is larger than the N ac determined for the priority indicated by the triggering DCI, denoted as $$N_{HARQ-ACK,c}^{\frac{CBG}{TB},max,DCI}, N_{HARQ-ACK,c}^{\frac{CBG}{TB},max,DCI}$$

HARQ-ACK bits are included in the Type-3 HARQ-ACK codebook for each TB, and the CBG HARQ-ACK states for the DL HARQ processes are set for the bits starting with the HARQ-ACK bit corresponding to the CBG #0 until the HARQ-ACK bit corresponding to the CBG $$\#N_{HARQ-ACK,c}^{\frac{CBG}{TB},max,DCI} - 1.$$

If PDSCH-CodeBlockGroupTransmission associated with the HARQ-ACK codebook of a priority is not configured, only TB level HARQ-ACK bits are included in one Type-3 HARQ-ACK codebook triggered by one DCI indicating the priority.

In one implementation, pdsch-HARQ-ACK-OneShotFeedbackNDI-r16 or pdsch-HARQ-ACK-OneShotFeedbackCBG-r16 may be configured separately for one Type-3 HARQ-ACK codebook triggered by DCIs indicating high priority and for one Type-3 HARQ-ACK codebook triggered by DCIs indicating low priority. If two pdsch-HARQ-ACK-OneShotFeedbackNDI-r16 are configured, each pdsch-HARQ-ACK-OneShotFeedbackNDI-r16 is applied to the Type-3 HARQ-ACK codebook triggered by the DCIs indicating the corresponding priority. Similarly, if two pdsch-HARQ-ACK-OneShotFeedbackCBG-r16 are configured, each pdsch-HARQ-ACK-OneShotFeedbackCBG-r16 is applied to the Type-3 HARQ-ACK codebook triggered by the DCIs indicating the corresponding priority. In one implementation, if only one pdsch-HARQ-ACK-OneShotFeedbackNDI-r16 or one pdsch-HARQ-ACK-OneShotFeedbackCBG-r16 is configured, it is applied to one Type-3 HARQ-ACK codebook triggered by the DCIs indicating low priority. In one implementation, if only one pdsch-HARQ-ACK-OneShotFeedbackNDI-r16 or pdsch-HARQ-ACK-OneShotFeedbackCBG-r16 is configured, it is applied to one Type-3 HARQ-ACK codebook triggered by the DCIs indicating high priority. In one implementation, if only one pdsch-HARQ-ACK-OneShotFeedbackNDI-r16 or pdsch-HARQ-ACK-OneShotFeedbackCBG-r16 is configured, the UE may not expect to be triggered with one Type-3 HARQ-ACK codebook by the DCI indicating high priority. In one implementation, if only one pdsch-HARQ-ACK-OneShotFeedbackNDI-r16 or pdsch-HARQ-ACK-OneShotFeedbackCBG-r16 is configured, the UE may not expect to be triggered with one Type-3 HARQ-ACK codebook by the DCI indicating low priority. The following implementations provide methods for one UE with different complexities or capabilities to report the supported PUCCH transmission configurations for Type-3 HARQ-ACK codebooks.

In one implementation, if the Type-3 HARQ-ACK codebook is supported to be triggered by one DCI indicating high priority, the UE may report for the following configuration:
PUCCH-Config associated with the high priority HARQ-ACK codebook is not configured with subslotLengthForPUCCH-r16 (e.g., not supporting subslot-based PUCCH transmission for Type-3 HARQ-ACK codebook), and PDSCH-CodeBlockGroupTransmission associated with the HARQ-ACK codebook is not configured or PDSCH-CodeBlockGroupTransmission associated with the HARQ-ACK codebook is configured.

PUCCH-Config associated with the high priority HARQ-ACK codebook is configured with subslotLengthForPUCCH-r16 (e.g., supporting subslot-based PUCCH transmission for Type-3 HARQ-ACK codebook), and PDSCH-CodeBlockGroupTransmission associated with the HARQ-ACK codebook is not configured or PDSCH-CodeBlockGroupTransmission associated with the HARQ-ACK codebook is configured.

In one implementation, if the Type-3 HARQ-ACK codebook is supported to be triggered by the DCI indicating low priority, the UE may report for the following configuration:
PUCCH-Config associated with the low priority HARQ-ACK codebook is configured with subslotLengthForPUCCH-r16 (e.g., supporting subslot-based PUCCH transmission for Type-3 HARQ-ACK codebook), and PDSCH-CodeBlockGroupTransmission associated with the HARQ-ACK codebook is not configured or PDSCH-CodeBlockGroupTransmission associated with the HARQ-ACK codebook is configured.

In one implementation, the gNB may configure the UE to trigger the Type-3 HARQ-ACK codebook with a specific priority by an explicit RRC parameter. In one implementation, the UE may not expect to be triggered with the Type-3 HARQ-ACK codebook by the DCI indicating a priority being not the same as the configured priority.

In one implementation, the gNB may configure the UE with an additional pdsch-HARQ-ACK-OneShotFeedback-r16 IE to indicate that the UE may be triggered with the Type-3 HARQ-ACK codebook by the DCI indicating high priority. In one implementation, the IE may be included in one pdsch-HARQ-ACK-OneShotFeedbackList-r17. In one implementation, if the additional pdsch-HARQ-ACK-OneShotFeedback-r16 IE is not configured, the UE may not expect to be triggered with the Type-3 HARQ-ACK codebook by the DCI indicating high priority. In one implementation, if the additional pdsch-HARQ-ACK-OneShotFeedback-r16 IE is not configured, the UE may assume that one triggered Type-3 HARQ-ACK codebook is transmitted with the configurations of the low priority HARQ-ACK codebook.

In one implementation, a priority index of which one DL HARQ process is scheduled may be configured or indicated by being appended to the HARQ-ACK bits corresponding to the HARQ process in the Type-3 HARQ-ACK codebook.

In some implementations, solutions and/or methods for addressing the HARQ-ACK retransmission are provided for the high priority HARQ-ACK codebook and the low priority HARQ-ACK codebook, which includes the configuration and scheduling of the enhanced Type-2 HARQ-ACK codebook as well as the Type-3 HARQ-ACK codebook for both the high priority HARQ-ACK codebook and the low priority HARQ-ACK codebook. The proposed solutions and/or methods provide more flexibility for the size of an enhanced Type-2 HARQ-ACK or a Type-3 HARQ-ACK codebook, which can improve the reliability of HARQ-ACK transmission.

Please refer to FIG. 1, which illustrates a procedure 10 for transmitting the HARQ-ACK codebook performed by a UE according to an implementation of the present disclosure. As shown in FIG. 1, the procedure 10 for the UE includes the following actions:

Action 100: Start.

Action 102: Receive a first RRC configuration including at least one parameter.

Action 104: Receive a DCI format.

Action 106: Determine a first Type-3 HARQ-ACK codebook size and a second Type-3 HARQ-ACK codebook size based on the at least one parameter.

Action 108: Transmit the HARQ-ACK codebook based on the DCI format and one of the first Type-3 HARQ-ACK codebook size and the second Type-3 HARQ-ACK codebook size.

Action 110: End.

Preferably, action 102 to action 108 of the procedure 10 may be performed by the UE. In some implementations, the UE may receive the first RRC configuration including the at least one parameter and receive the DCI format in action 102 and action 104, respectively. In action 106, the UE may determine the first Type-3 HARQ-ACK codebook size and the second Type-3 HARQ-ACK codebook size based on the at least one parameter. In action 108, the UE may transmit the HARQ-ACK codebook based on the DCI format and one of the first Type-3 HARQ-ACK codebook size and the second Type-3 HARQ-ACK codebook size. In some implementations, the procedure 10 may further configure the UE to transmit the HARQ-ACK codebook only based on the DCI format and the second Type-3 HARQ-ACK codebook size, where a first value of the first Type-3 HARQ-ACK codebook size is larger than a second value of the second Type-3 HARQ-ACK codebook size. Certainly, the detailed mechanisms and/or operations (e.g., action 102 to action 108) of the procedure 10 are described in above paragraphs and omitted hereinafter for brevity.

In some implementations, the procedure 10 may further configure the UE to receive a second RRC configuration including a first PUCCH resource configuration and a second PUCCH resource configuration; to determine a priority indicated by the DCI format; to determine a selected PUCCH resource configuration based on the first PUCCH resource configuration and the second PUCCH resource configuration; and to transmit the HARQ-ACK codebook based on the selected PUCCH resource configuration. Specifically, the selected PUCCH resource configuration is the first PUCCH resource configuration if the priority is one low priority, and the selected PUCCH resource configuration is the second PUCCH resource configuration if the priority is one high priority.

In some implementations, the at least one parameter includes one of a new data indicator parameter, a CBG parameter, and a priority parameter. In some implementation, the procedure 10 may further configure the UE to retransmit the HARQ-ACK codebook based on the DCI format and one of the first Type-3 HARQ-ACK codebook size and the second Type-3 HARQ-ACK codebook size.

Figure 2:
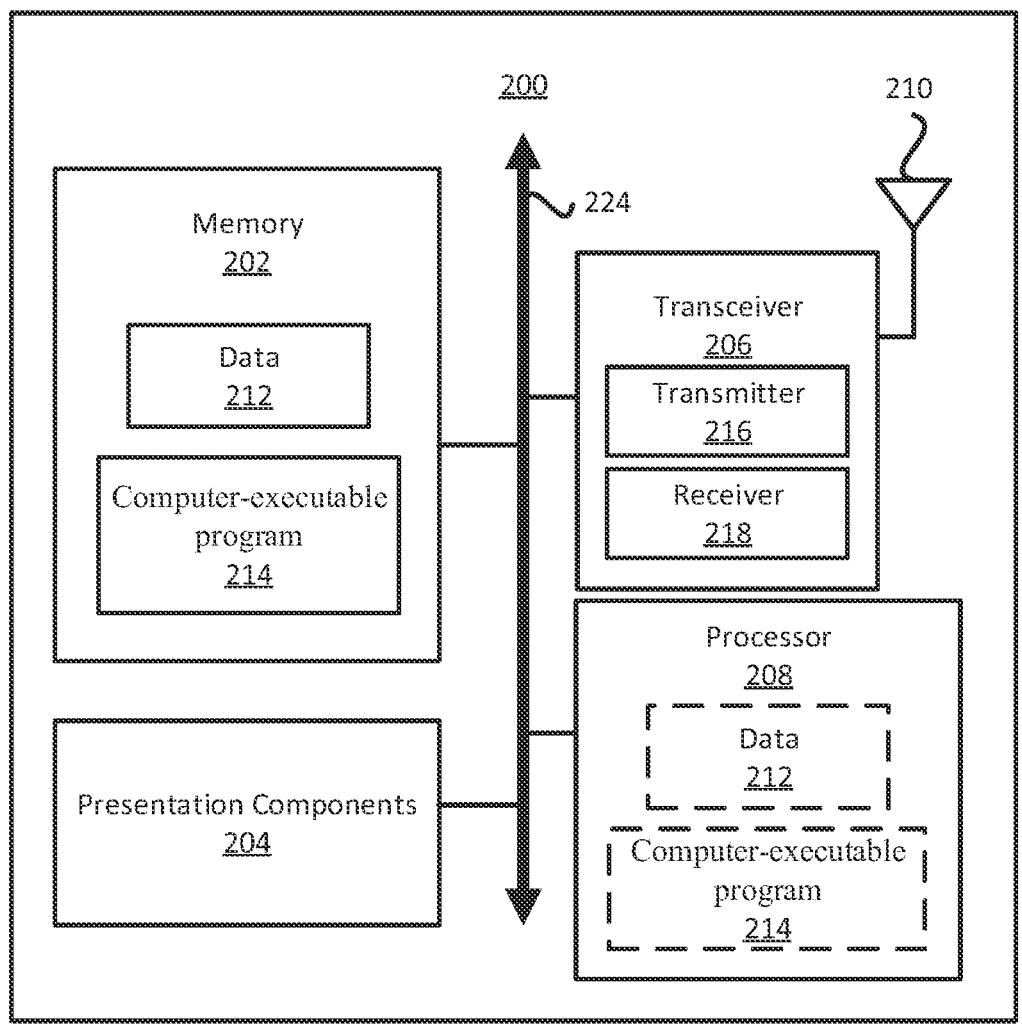
FIG. 2 illustrates a block diagram of a node for wireless communication according to an implementation of the present disclosure.

Please refer to FIG. 2, which illustrates a block diagram of a node 200 for wireless communication according to an implementation of the present disclosure. As illustrated in FIG. 2, the node 200 includes a transceiver 206, a processor 208, a memory 202, one or more presentation components 204, and at least one antenna 210. The node 200 may also include a Radio Frequency (RF) spectrum band module, a BS communications module, an NW communications module, and a system communications management module, input/output (I/O) ports, I/O components, and power supply (not explicitly illustrated in FIG. 2). Each of these components may be in communication with each other, directly or indirectly, over one or more buses 224. The node 200 may be a UE or a BS that performs various functions disclosed herein, for example, with reference to FIG. 1.

The transceiver 206 includes a transmitter 216 (e.g., transmitting/transmission circuitry) and a receiver 218 (e.g., receiving/reception circuitry) and may be configured to transmit and/or receive time and/or frequency resource partitioning information. The transceiver 206 may be configured to transmit in different types of subframes and slots, including, but not limited to, usable, non-usable, and flexibly usable subframes and slot formats. The transceiver 206 may be configured to receive data and control channels.

The node 200 may include a variety of computer-readable media. Computer-readable media may be any available media that may be accessed by the node 200 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable. Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal, such as a carrier wave, or other transport mechanism and include any information delivery media.

The term "modulated data signal" may refer to a signal that has one or more of its characteristics set or changed in such a manner as to encode information in the signal. By way of example, and not limitation, communication media may include wired media, such as a wired NW or direct-wired connection, and wireless media, such as acoustic, RF, infrared, and other wireless media. Combinations of any of the previous disclosure should also be included within the scope of computer-readable media.

The memory 202 may include computer-storage media in the form of volatile and/or non-volatile memory. The memory 202 may be removable, non-removable, or a combination thereof. For example, the memory 202 may include solid-state memory, hard drives, optical-disc drives, etc.

As illustrated in FIG. 2, the memory 202 may store a computer-executable (or readable) program 214 (e.g., software codes) that are configured to, when executed, cause the processor 208 to perform various functions disclosed herein, for example, with reference to FIG. 2. Alternatively, the computer-executable program 214 may not be directly executable by the processor 208 but may be configured to cause the node 200 (e.g., when compiled and executed) to perform various functions disclosed herein.

The processor 208 (e.g., having processing circuitry) may include an intelligent hardware device, a Central Processing Unit (CPU), a microcontroller, an ASIC, etc. The processor 208 may include memory. The processor 208 may process the data 212 and the computer-executable program 214 received from the memory 202, and information received via the transceiver 206, the baseband communications module, and/or the NW communications module. The processor 208 may also process information to be sent to the transceiver 206 for transmission through the antenna 210 to the NW communications module for subsequent transmission to a CN.

One or more presentation components 204 may present data to a person or other device. Examples of presentation components 204 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) for transmitting a Hybrid Automatic Repeat Request-Acknowledgment (HARQ-ACK) codebook, the method comprising:
    transmitting a report indicating that the UE supports transmission of more than one Type-3 HARQ-ACK codebook;
    receiving a first Radio Resource Control (RRC) configuration including at least one parameter and receiving a second RRC configuration including a first Physical Uplink Control Channel (PUCCH) resource configuration and a second PUCCH resource configuration, the first PUCCH resource configuration being associated with a first HARQ-ACK codebook and the second PUCCH resource configuration being associated with a second HARQ-ACK codebook;
    receiving a Downlink Control Information (DCI) format;
    determining a priority indicated by the DCI format;
    selecting one of the first PUCCH resource configuration or the second PUCCH resource configuration based on the priority;
    determining a PUCCH resource from the selected one of the first PUCCH resource configuration or the second PUCCH resource configuration based on a PUCCH resource indicator field in the DCI format;
    determining a slot based on the selected one of the first PUCCH resource configuration or the second PUCCH resource configuration and based on a Physical Downlink Shared Channel-to-HARQ (PDSCH-to-HARQ) feedback timing indicator field in the DCI format;
    determining a size of a third HARQ-ACK codebook based on the DCI format and the at least one parameter, the third HARQ-ACK codebook being a Type-3 HARQ-ACK codebook; and
    transmitting the third HARQ-ACK codebook via the PUCCH resource in the slot, wherein:
    the at least one parameter includes a new data indicator parameter and a Code Block Group (CBG) parameter, and
    the CBG parameter is associated with the priority.

2. The method according to claim 1, wherein the report indicates that the UE supports the transmission of the more than one Type-3 HARQ-ACK codebook in more than one subslot of the slot.

3. The method according to claim 1, wherein:
    the selected one of the first PUCCH resource configuration or the second PUCCH resource configuration is the first PUCCH resource configuration if the priority is a low priority; and
    the selected one of the first PUCCH resource configuration or the second PUCCH resource configuration is the second PUCCH resource configuration if the priority is a high priority.

4. The method according to claim 1, wherein:
    the first HARQ-ACK codebook is a Type-1 HARQ-ACK codebook or a Type-2 HARQ-ACK codebook; and
    the second HARQ-ACK codebook is the Type-1 HARQ-ACK codebook or the Type-2 HARQ-ACK codebook.

5. A User Equipment (UE) in a wireless communication system for transmitting a Hybrid Automatic Repeat Request-Acknowledgment (HARQ-ACK) codebook, the UE comprising:
    at least one processor; and
    at least one memory coupled to the at least one processor, the at least one memory storing one or more computer-executable instructions that, when executed by the at least one processor, cause the UE to:
    transmit a report indicating that the UE supports transmission of more than one Type-3 HARQ-ACK codebook;
    receive a first Radio Resource Control (RRC) configuration including at least one parameter and receive a second RRC configuration including a first Physical Uplink Control Channel (PUCCH) resource configuration and a second PUCCH resource configuration, the first PUCCH resource configuration being associated with a first HARQ-ACK codebook and the second PUCCH resource configuration being associated with a second HARQ-ACK codebook;
    receive a Downlink Control Information (DCI) format;
    determine a priority indicated by the DCI format;
    select one of the first PUCCH resource configuration or the second PUCCH resource configuration based on the priority;
    determine a PUCCH resource from the selected one of the first PUCCH resource configuration or the second PUCCH resource configuration based on a PUCCH resource indicator field in the DCI format;

determine a slot based on the selected one of the first PUCCH resource configuration or the second PUCCH resource configuration and based on a Physical Downlink Shared Channel-to-HARQ (PDSCH-to-HARQ) feedback timing indicator field in the DCI format;

determine a size of a third HARQ-ACK codebook based on the DCI format and the at least one parameter, the third HARQ-ACK codebook being a Type-3 HARQ-ACK codebook; and transmit the third HARQ-ACK codebook via the PUCCH resource in the slot, wherein:

the at least one parameter includes a new data indicator parameter and a Code Block Group (CBG) parameter, and the CBG parameter is associated with the priority.

6. The UE according to claim 5, wherein the report indicates that the UE supports the transmission of the more than one Type-3 HARQ-ACK codebook in more than one subslot of the slot.

7. The UE according to claim 5, wherein:

the selected one of the first PUCCH resource configuration or the second PUCCH resource configuration is the first PUCCH resource configuration if the priority is a low priority; and the selected one of the first PUCCH resource configuration or the second PUCCH resource configuration is the second PUCCH resource configuration if the priority is a high priority.

8. The UE according to claim 5, wherein:

the first HARQ-ACK codebook is a Type-1 HARQ-ACK codebook or a Type-2 HARQ-ACK codebook; and the second HARQ-ACK codebook is the Type-1 HARQ-ACK codebook or the Type-2 HARQ-ACK codebook.

9. A Base Station (BS) in a wireless communication system for receiving a Hybrid Automatic Repeat Request-Acknowledgment (HARQ-ACK) codebook from a User Equipment (UE), the BS comprising:

at least one processor; and at least one memory coupled to the at least one processor, the at least one memory storing one or more computer-executable instructions that, when executed by the at least one processor, cause the BS to:

receive a report indicating that the UE supports transmission of more than one Type-3 HARQ-ACK codebook;

transmit a first Radio Resource Control (RRC) configuration including at least one parameter and transmit a second RRC configuration including a first Physical Uplink Control Channel (PUCCH) resource configuration and a second PUCCH resource configuration, the first PUCCH resource configuration being associated with a first HARQ-ACK codebook and the second PUCCH resource configuration being associated with a second HARQ-ACK codebook;

transmit a Downlink Control Information (DCI) format; and receive a third HARQ-ACK codebook via a PUCCH resource in a slot, wherein:

the DCI format indicates a priority to instruct the UE to select one of the first PUCCH resource configuration or the second PUCCH resource configuration, a PUCCH resource indicator field in the DCI format instructs the UE to determine the PUCCH resource from the selected one of the first PUCCH resource configuration or the second PUCCH resource configuration, a Physical Downlink Shared Channel-to-HARQ (PDSCH-to-HARQ) feedback timing indicator field in the DCI format as well as the selected one of the first PUCCH resource configuration or the second PUCCH resource configuration instruct the UE to determine the slot, the DCI format and the at least one parameter instruct the UE to determine a size of the third HARQ-ACK codebook, the third HARQ-ACK codebook being a Type-3 HARQ-ACK codebook, the at least one parameter includes a new data indicator parameter and a Code Block Group (CBG) parameter, and the CBG parameter is associated with the priority.

10. The BS according to claim 9, wherein the report indicates that the UE supports the transmission of the more than one Type-3 HARQ-ACK codebook in more than one subslot of the slot.

11. The BS according to claim 9, wherein:

the selected one of the first PUCCH resource configuration or the second PUCCH resource configuration is the first PUCCH resource configuration if the priority is a low priority; and the selected one of the first PUCCH resource configuration or the second PUCCH resource configuration is the second PUCCH resource configuration if the priority is a high priority.

12. The BS according to claim 9, wherein:

the first HARQ-ACK codebook is a Type-1 HARQ-ACK codebook or a Type-2 HARQ-ACK codebook; and the second HARQ-ACK codebook is the Type-1 HARQ-ACK codebook or the Type-2 HARQ-ACK codebook.

* * * * *